May 13, 1958   T. TOLLEY   2,834,320
PIG FEEDER
Filed April 5, 1955
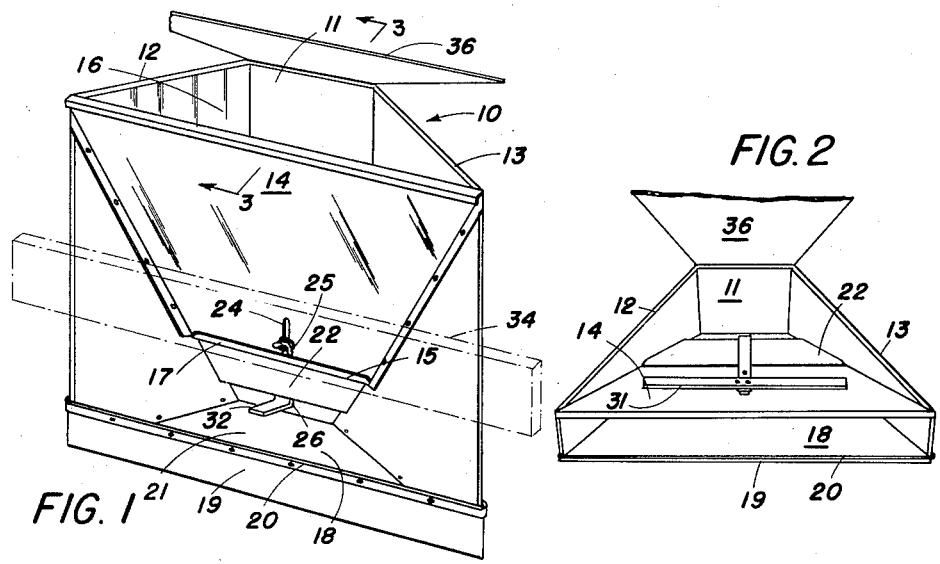
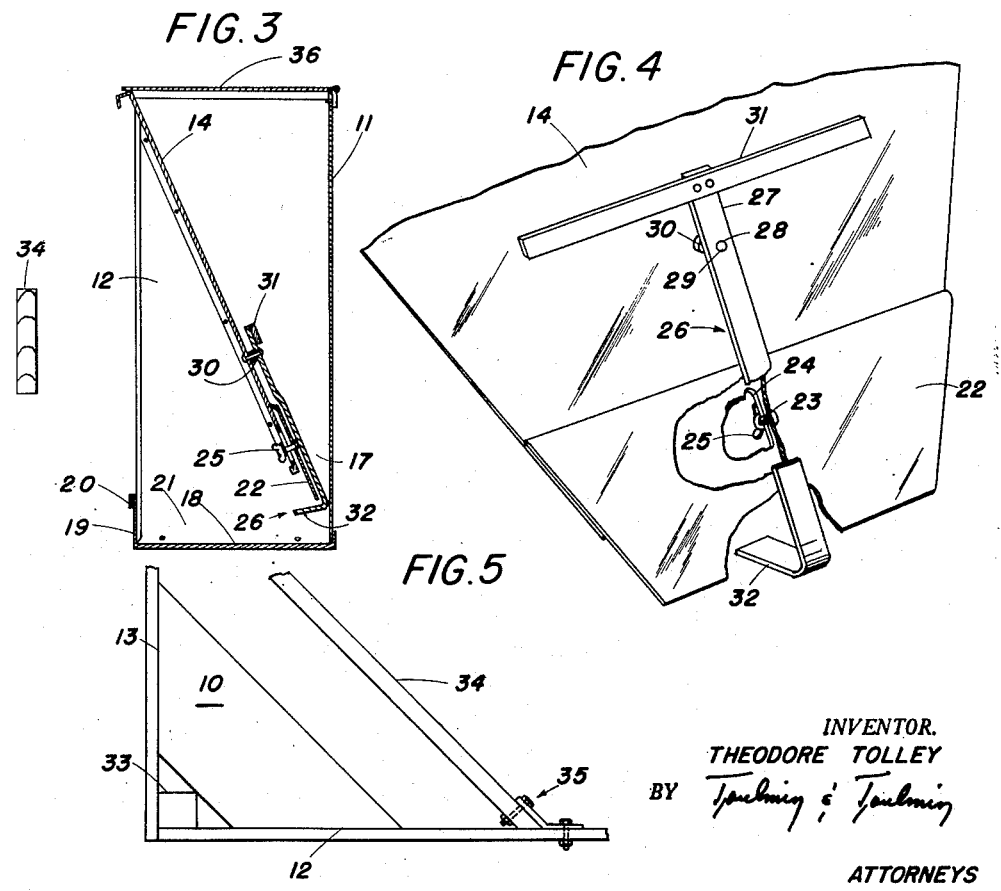
INVENTOR.
THEODORE TOLLEY
BY Toulmin & Toulmin
ATTORNEYS

United States Patent Office 2,834,320
Patented May 13, 1958

2,834,320

PIG FEEDER

Theodore Tolley, Eaton, Ohio

Application April 5, 1955, Serial No. 499,270

3 Claims. (Cl. 119—53)

The present invention relates to animal feeding devices, more particularly to a pig feeder which is accessible to little pigs but inaccessible to the sow.

In agriculture, constant attention is given to increasing production of both crops and livestock. In the raising of livestock in general, various methods and devices have been adopted in order to enable a greater percentage of livestock to grow to maturity.

A particular problem arises in regard to the raising of hogs. It is the usual practice to keep a sow together with her litter in a common pen. The problem then arises of providing adequate feeding facilities to enable the little pigs to receive sufficient food.

When ordinary feeding troughs or other devices are provided from which both the sow and her progeny are to feed, the little pigs fail to get their share of food because of crowding and interference by the sow. Not only are the little pigs prevented from eating but they are also exposed to injury from the efforts of the sow to reach the feed. Improper feeding and injuries to little pigs contribute to hold down the production of hogs.

In addition, it has been found that food should be made readily available to the little pigs as soon as possible. Thus they can be weaned as early as four or five weeks with a better gain of weight and with the sow being left in a more healthful condition.

The above-mentioned disadvantages can be readily overcome when a special feeding device is provided which enables little pigs to have ready access to the feed but bars access to the sow and any other grown hogs in the vicinity of the feed.

The present invention provides a feeder which is especially adapted for little pigs. The feeder essentially comprises a hopper having a front wall which is inclined rearwardly. The side walls of the hopper are converging to enable the feeder to be positioned in a corner of the pen. There is a feed trough beneath the hopper. The hopper has an opening at the lower end thereof above the feed trough. Suitable mechanism is provided to selectively vary the size of the opening in order that the flow of feed to the trough may be closely regulated. In addition, an agitator is provided which is activated by the feeding pigs and serves to agitate the feed so as to insure a continuous flow into the feeding trough. The relationship of the inclined wall and the converging side walls restrict access by the sow but readily permits the little pigs to feed from the trough. With this arrangement the feed flows from the hopper into the rear portion of the feed trough. The inclined wall prevents the sow from reaching the feed in the trough. The feeder may be used to disperse either liquid or solid feed, depending upon the age of the little pigs. Initially, when the pigs are only a few weeks old liquid feed is provided in order to wean the little pigs as soon as possible.

A beam or board may be positioned across the corner of the pen in front of the open side of the feeder to prevent the sow from approaching the feeder itself.

It is, therefore, the principal object of this invention to provide a pig feeder especially adapted for the feeding of little pigs.

It is another object of this invention to provide a pig feeder having a feeding trough which is inaccessible to the sow but is readily accessible to little pigs.

It is a further object of this invention to provide a pig feeder wherein the flow of feed to a feeding trough may be closely regulated.

It is an additional object of this invention to provide a pig feeder where the feeding pigs operate agitating mechanism to cause a free and continuous flow of feed.

It is still another object of this invention to provide an inexpensive feeder for little pigs having a simplified but strong construction and adapted to be positioned in a corner of the pen.

Other objects and advantages of this invention will become readily apparent upon reference to the following description when taken in conjunction with the accompanying drawings, wherein:

Figure 1 is a perspective view looking at the front of the pig feeder;

Figure 2 is a top perspective view of the feeder drawn to a reduced scale;

Figure 3 is a vertical sectional view taken long the line 3—3 of Figure 1;

Figure 4 is a detailed view in enlarged scale showing both the sliding plate and agitator mechanism structure with other parts broken away for clarity; and Figure 5 is a top plan view drawn to a reduced scale showing the manner of installing the feeder in a corner of the pen and positioning a board shown in a fragmentary view or the like in front of the feeder.

Returning now to the drawings, more particularly to Figure 1 wherein like reference symbols indicate the same parts throughout the various views, 10 indicates generally a pig feeder constructed in accordance with the teachings of this invention. Feeder 10 comprises a rear wall 11 and side walls 12 and 13 diverging from said rear wall. The rear side wall may be formed with a single sheet of metal which may be suitably bent to form the structure described. In order that the feeder may be readily accommodated within a corner, the side walls 12 and 13 form a right angle if extended to a point of intersection.

There is an inclined front wall 14 which extends from the top forward corners of the side walls 12 and 13 downwardly and rearwardly to a point where the lower edge of the front wall indicated at 15 is spaced laterally from the rear wall 11 and above the bottom edges of the side and rear walls. The inclined front wall 14, together with the rear wall 11 and side walls 12 and 13 form a hopper 16 having an opening 17.

The angle of inclination of the front wall 14 with the bottom of the feeder should form a restricted space which denies access of the sow to feed located near the lower end of the front wall.

There is a base member or bottom wall 18 which interconnects the bottom edges of the side walls 12 and 13 and the rear wall 11. The base member 18 has an upturned portion 19 along the front edge of the feeder 10. There is a reinforcing strip 20 along the top edge from the upturned portion 19. The upturned portion 19 together with the base member 18 and the lower portions of the side walls 12 and 13 and rear wall 11 form a feeding trough 21.

The size of the discharge opening 17 may be carefully regulated by positioning a sliding plate 22. The plate 22 is mounted upon the upper surface of the inclined front wall 14 by means of a threaded bolt 23 which extends through a substantially vertical slot 24 in the front wall 14. A wing nut 25 is threaded upon the end of the bolt 23. With this structure it is possible to adjust the discharge opening to any size desired and then to tighten the nut 25 to maintain the sliding plate 22 in position.

The pig feeder of this invention is also provided with an agitating mechanism indicated generally at 26 and illustrated in Figure 4.

The agitator mechanism 26 comprises an arm 27 which is pivotally mounted at 28 by means of a rivet 29 which is secured to the inclined front wall 14. A washer 30 is positioned between the inclined front wall 14 and the arm 27 to space the arm 27 above the sliding plate 22. A cross member 31 is suitably secured to the upper end of the arm 27 by rivets or the like.

The lower end of the agitator arm 27 is bent forwardly to form an operating portion 32 which extends into the feeding trough 21 and is substantially parallel to the base member 18.

Movement of the operating portion 32 by the feeding pigs as they feed in the trough 21 serves to pivot the agitator arm 27 and the subsequent movement of the agitating mechanism prevents clogging of the feed. Consequently, the agitating mechanism will provide a constant flow of feed through the discharge opening into the feeding trough.

Figure 5 illustrates the manner in which the pig feeder of this invention may be positioned in the corner of a pen. By employing a flat rear wall 11, it can be seen that space is left for the corner post indicated at 33 and the side walls 12 and 13 of the feeder will be flush against the side walls of the pen. A beam or board indicated at 34 may be suitably bolted as at 35 across the corner of the pen in front of the feeder 10. The elevational relationship of the beam 34 with respect to the feeder is illustrated in Figure 3. The use of the beam 34 will prevent the sow from approaching the feeder.

As indicated previously, the entire construction of the feeder may be of sheet metal of a suitable gage assembled by riveting or welding. All exposed ends of the metallic material are rolled to eliminate any sharp edges. The feeder may be readily constructed from any other available and suitable materials. It has been found that a metal feeder is more satisfactory as metal is better able to resist the onslaughts of the feeding pigs and the effects of weather.

If desired, a closure member as indicated at 36 may be pivotally mounted from the top edge of the rear wall 11 (as shown) or from the top edge of the inclined front wall 14.

Thus it can be seen that the pig feeder described as this invention is particularly adapted for feeding little pigs. By discharging the feed into the rear portion of the feeding trough and providing an inclined forward wall above the feeding trough, access is subsequently denied to the sow. The inclined forward wall of the hopper, as described, has given satisfactory results. However, it is pointed out that numerous contours of the front wall may be devised which would also deny access by the sow to the feeding trough. The agitating mechanism and the regulating plate are mounted to permit a predetermined amount of feed to be discharged into the feeding trough at all times. In addition, the simple and inexpensive construction of the pig feeder will enhance the advantages to be derived from use of this invention.

It will be understood that this invention is susceptible to modification in order to adapt it to different usages and conditions, and, accordingly, it is desired to comprehend such modifications within this invention as may fall within the scope of the appended claims.

What is claimed is:

1. In a pig feeder accessible to little pigs but inaccessible to the sow, a flat rear wall, a pair of side walls diverging from the ends of said rear wall at right angles to each other, a bottom wall interconnecting the bottom edges of said side and rear walls, a first front wall upstanding from the front edge of said bottom wall to form a feed trough therein, a second front wall between said side walls and extending on an incline toward said rear wall from the top edge of said side walls to a line above said bottom wall and forwardly of said rear wall to form with said side and rear a wall hopper having an opening at the lower end thereof, the first front wall and the front edges of said side, second front wall and bottom wall being positioned in the same vertical plane.

2. In a pig feeder accessible to little pigs but inaccessible to the sow, a flat rear wall, a pair of side walls diverging from the ends of said rear wall at right angles to each other, a bottom wall interconnecting the bottom edges of said side and rear walls, a first front wall upstanding from the front edge of said bottom wall to form a feed trough therein, a second front wall between said side walls and extending on an incline toward said rear wall from the top edge of said side walls to a line above said bottom wall and forwardly of said rear wall to form with said side and rear a wall hopper having an opening at the lower end thereof, said feed trough being positioned completely beneath said inclined second front wall, the first front wall and the front edges of said side, second front wall and bottom wall being positioned in the same vertical plane.

3. In a pig feeder accessible to little pigs but inaccessible to the sow, a flat rear wall, a pair of side walls diverging from the ends of said rear wall at right angles to each other, a bottom wall interconnecting the bottom edges of said side and rear walls, a first front wall upstanding from the front edge of said bottom wall to form a feed trough therein, a second front wall between said side walls and extending on an incline toward said rear wall from the top edge of said side walls to a line above said bottom wall and forwardly of said rear wall to form with said side and rear a wall hopper having an opening at the lower end thereof, the angle of inclination of said second front wall being sufficiently steep so as to form with said divergent side walls a restricted space in said trough so as to deny access to the feed trough by the sow, the first front wall and the front edges of said side, second front wall and bottom wall being positioned in the same vertical plane.

References Cited in the file of this patent

UNITED STATES PATENTS

| Number | Name | Date |
|---|---|---|
| 120,906 | Gould et al. | Nov. 14, 1871 |
| 878,621 | Engelbrecht | Feb. 11, 1908 |
| 993,630 | Worsham et al. | May 30, 1911 |
| 1,121,502 | Hornbeck | Dec. 15, 1914 |
| 1,175,124 | Clough | Mar. 14, 1916 |
| 1,215,725 | Shelley | Feb. 13, 1917 |
| 1,257,399 | Robbins | Feb. 26, 1918 |
| 1,788,092 | Fink | Jan. 6, 1931 |
| 2,189,213 | MacDonell | Feb. 6, 1940 |
| 2,525,385 | Uhrenholdt | Oct. 10, 1950 |
| 2,640,464 | Jindrich | June 2, 1953 |